United States Patent [19]

Marshall

[11] Patent Number: 5,569,346
[45] Date of Patent: Oct. 29, 1996

[54] METHOD AND KIT TO RESTORE THE APPEARANCE OF A DAMAGED LENS

[75] Inventor: Todd C. Marshall, Palm Beach Gardens, Fla.

[73] Assignee: Green Island Research, Inc., Palm Gardens, Fla.

[21] Appl. No.: 332,075

[22] Filed: Nov. 1, 1994

[51] Int. Cl.$^6$ .................................................. B32B 35/00
[52] U.S. Cl. ......................... 156/94; 29/402.09; 156/98; 428/63
[58] Field of Search .......................... 156/94, 98; 428/63; 29/402.09, 402.11

[56] References Cited

U.S. PATENT DOCUMENTS

| | | | |
|---|---|---|---|
| 3,850,718 | 11/1974 | Trapani | 156/94 |
| 4,047,300 | 9/1977 | Sweeney | 156/98 |
| 4,047,994 | 9/1977 | Kamatsu | 156/98 |
| 4,147,576 | 4/1979 | Beem | 156/94 |
| 4,358,495 | 11/1982 | Parker | 156/94 |
| 4,497,755 | 2/1985 | Korsyn | 264/1.7 |
| 4,661,182 | 4/1987 | Lerner | 156/94 |
| 4,732,633 | 3/1988 | Pokorny | 156/94 |
| 5,049,870 | 9/1991 | Fitzgerald | 340/815.2 |
| 5,401,152 | 3/1995 | Jacino | 156/94 |

OTHER PUBLICATIONS

Physical Property Data Sheet for Kodar PETEG Copolyester 6763.
Product Specification for Scotch-Grip 4475 Industrial Adhesive.

*Primary Examiner*—Daniel J. Stemmer
*Attorney, Agent, or Firm*—Finnegan, Henderson, Farabow, Garrett & Dunner, L.L.P.

[57] ABSTRACT

A method and kit for restoring the appearance of a damaged area of a patterned lens. In the method a clear thermoplastic patch is fitted to overlap the damaged area, a patterned plastic sheet is adhered to the clear plastic patch to form a patterned patch, and the patterned patch is bonded to the lens while covering the damaged area. The kit comprises a translucent thermoplastic patch, a patterned plastic sheet, and a bonding agent.

18 Claims, 1 Drawing Sheet

METHOD AND KIT TO RESTORE THE APPEARANCE OF A DAMAGED LENS

FIELD OF THE INVENTION

This invention relates to a method and a kit for restoring the appearance of a damaged area of a patterned lens or lens assembly. The method or kit is particularly useful in restoring cracked or otherwise damaged lenses on, for example, automobiles, recreation vehicles, campers, trailers, signal lights, etc.

BACKGROUND OF THE INVENTION

Lenses covering light assemblies on cars, trucks, other automobiles, industrial equipment, etc., particularly plastic lenses, can be damaged by cracks or holes. Oftentimes this damage is repaired by covering the damaged area with a translucent tape or paper, which may or may not be the same color as the damaged lens. Such repairs are at best temporary and are generally unsatisfactory from a cosmetic or aesthetic point of view. The only permanent manner to restore the damaged lens, without compromising its appearance, is to replace the lens entirely.

Thus, there exists a need for a method to restore the appearance of a damaged lens without having to replace the lens. The restoration should be a permanent restoration and should not detract from the appearance of the lens.

SUMMARY OF THE INVENTION

The present invention satisfies the need for a method to restore the appearance of a damaged lens. Accordingly, the present invention provides a method for restoring the appearance of a damaged area of a patterned lens. In the method a clear thermoplastic patch is fitted to overlap the damaged area, a patterned plastic sheet is adhered to the clear plastic patch to form a patterned patch, and the patterned patch is bonded to the lens while covering the damaged area.

The invention also provides a kit to restore the appearance of a damaged area of a patterned lens. The kit comprises a translucent thermoplastic patch, a patterned plastic sheet, and a bonding agent.

DETAILED DESCRIPTION OF THE INVENTION

Figure 1:
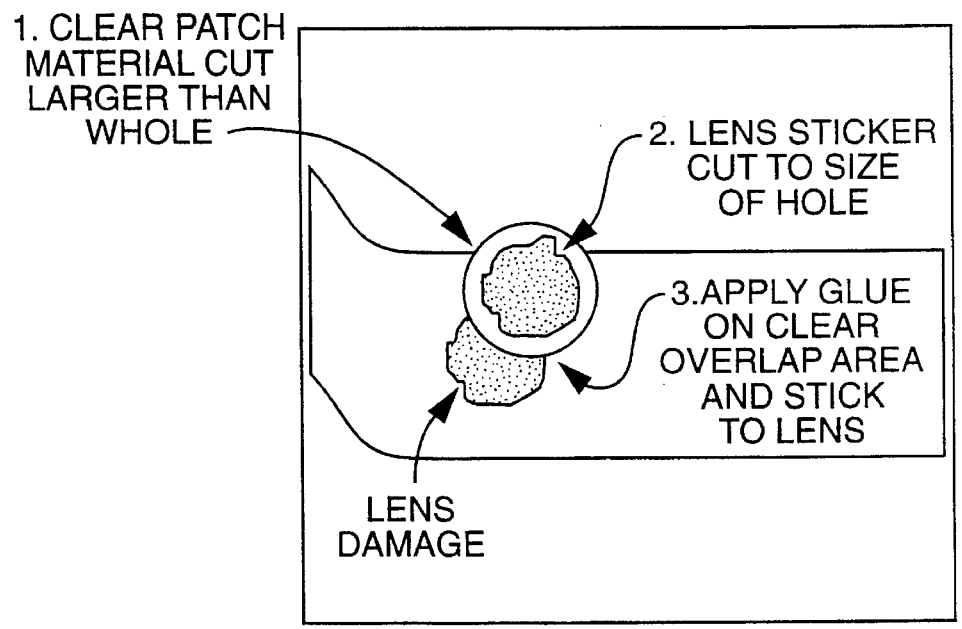
FIG. 1 depicts a method for restoring the appearance of a damaged area of a patterned lens according to the invention.

This invention relates to a method and a kit for restoring the appearance of a damaged area of a patterned lens or lens assembly, particularly plastic lenses. As depicted in FIG. 1, the method and the kit can be used to restore lenses covering lights on, for example, automobiles, trailers, industrial equipment, recreational vehicles, campers, boats, planes, and traffic signals. Such lights include, but are not limited to, tail lights, signal lights, back-up lights, parking lights, and marker lights. The method and kit of this invention advantageously allow for permanent restoration of the appearance of a damaged lens and do not require the lens or lens assembly to As a first step in the method of this invention, a translucent thermoplastic patch is fitted to overlap the damaged area of the lens. This fitting step involves determining the size and location of lens area to be restored.

To restore flat areas, the translucent thermoplastic patch can be fitted by trimming a larger piece of the thermoplastic to cover and overlap the damaged area. For most thermoplastics, this is conveniently accomplished using scissors or other cutting means known in the art. Preferably the patch overlaps the damaged area by at least ¼" on all sides. The overlapping portion of the patch is used in a later step to bond the patch to the lens.

To restore curved or rounded areas, the patch is fitted using the same steps to determine its size and shape. The patch can then be fitted by warming or heating the thermoplastic to cause it to be sufficiently flexible or soft to be formed to fit the curved or rounded area. A preferred method is to drop the patch into boiling water for approximately 10 to 15 seconds, removing from water with needle-nosed pliers or tweezers, and, while the patch is still soft, pressing it over the damaged area to mold it to shape. Caution should be used when pressing the hot patch over the damaged area to avoid burns. Preferably, a cloth or glove is used to hold the patch while pressing it against the lens.

Any translucent thermoplastic which can be formed into sheets can be used as the translucent thermoplastic patch. Preferably, the thermoplastic should be capable of being made flexible or softened by moderate heating, stable in hot, cold, humid or dry environments, heat resistant and capable of being prepared in custom colors. The thermoplastic may contain common additives. For example, UV inhibitors or stabilizers can be added to prevent discoloration.

Synthetic thermoplastics are preferred and include, but are not limited to, polyester thermoplastics, polyvinylchloride thermoplastics, polyethylene thermoplastics, polyurethane thermoplastics, polystyrene thermoplastics, and polypropylene thermoplastics. Particularly preferred is extruded polyester thermoplastics, such as Kodar PETG Copolyester 6763, available from the Eastman Chemical Company.

The thermoplastic patch can be colored by means known in the art so that the patterned patch matches the color of the lens to be restored improving the aesthetic quality of the restoration. Thus, the use of colored patches represents a preferred embodiment of this invention. Preferably, the thermoplastic patch is colored and the patterned plastic (discussed below) is transparent, aside from the pattern. When the thermoplastic is an extruded polyester thermoplastic, the colorant or dye is can be added prior to or during the extrusion process. Preferred colors include clear, red, yellow, orange, and amber. These are the colors most commonly used in automobile lenses.

The thermoplastic patch should not be so thick that it detracts from the appearance of the lens when restored. The thermoplastic patch should preferably have a thickness of $\frac{1}{16}$ to $\frac{1}{64}$ of an inch, more preferably $\frac{1}{16}$ to $\frac{1}{32}$ of an inch, and most preferably about $\frac{1}{32}$ of an inch. Particularly preferred are 0.030 and 0.020 thermoplastic sheets.

Figure 2:
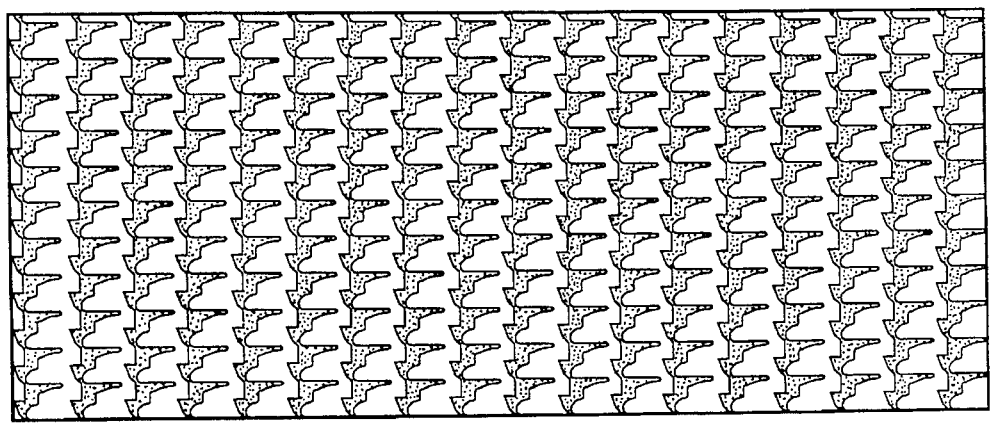
FIG. 2 depicts a lens pattern which may be used on the patterned plastic sheet.

The second step of the claimed method includes adhering a patterned plastic sheet to the translucent thermoplastic patch. Preferably, the pattern on the patterned plastic matches or is similar to the pattern of the lens to be restored. Matching or nearly matching the pattern in this way provides a better appearance for the restored lens. Thus, when light shines through the restored lens, the restored area does not appear to be different from the lens itself. A typical lens pattern for the plastic patterned sheet is shown in FIG. 2.

There may circumstances, however, where a different pattern is desired. In such circumstances the pattern on the patterned plastic would not match or even be similar to that of the lens to be repaired. When the lens is a reflector, the pattern is preferably designed to match or simulate the pattern of a reflector.

The patterned plastic adhered to the thermoplastic patch should match the size of the patch. Preferably, the patterned plastic is approximately the same size as the damaged area and does not extend into the overlapping regions of the patch which will be bonded to the lens.

The patterned plastic is a transparent, and preferably colorless, plastic such as polyethylene, acetate, or those described above for the patch, preferably polyethylene or acetate. However, the patterned plastic can be colored by techniques known in the art as with the thermoplastic patch. The same colors are preferred for the patterned plastic as described above for the thermoplastic patch.

The thickness of the patterned plastic should not be greater than that of the patch and preferably less. In general terms, the patterned plastic is preferably about the same thickness as the plastic used for overhead projector transparencies. Particularly preferred are 0.003 and 0.005 plastic sheets which have thicknesses of about 3 mm and 5 mm, respectively.

The plastic can be patterned using any means known in the art. This includes, but is not limited to, printing a pattern or tooling a pattern onto one surface of the plastic. The printing may be accomplished using offset, xerographic, or laser printing techniques. Particularly preferred is printing the pattern on the plastic from a printing plate bearing the lens pattern. The pattern is preferably printed in black ink.

The patterned plastic may be adhered to the thermoplastic patch by gluing the patterned plastic to the patch either before or after bonding the patch to the lens. Preferably, the nonpatterned side of the patterned plastic is adhered to the thermoplastic patch. Any glue capable of adhering the patterned plastic to the thermoplastic patch. Preferably, the patterned plastic is a sticker having the pattern on one side and an adhesive on the other, where the adhesive side is attached to a release sheet or backing prior to use. In this preferred embodiment, one simply peels the patterned plastic off the release sheet or backing and adheres it to the thermoplastic patch. Conveniently, the pattern can be printed directly onto an adhesive-backed plastic sheet.

Preferably, the patterned plastic is adhered to the fitted thermoplastic patch before the patch is bonded to the lens. Adhering the patterned plastic to the thermoplastic patch forms a patterned patch.

The patterned patch is then permanently bonded to the lens to cover the damaged area by using a bonding agent to glue the overlapping portion of the patch to the lens area surrounding the damaged area. Any adhesive may be used as the bonding agent in this bonding step. The bonding agent may be the same as the adhesive discussed above. Preferably, the bonding agent should be waterproof, heat resistant, UV resistant, and not be deteriorated by changing weather conditions. Clear or translucent, solvent-based adhesives are preferred. A particularly preferred bonding agent is the Scotch-Grip 4475 Industrial Adhesive available from 3M Corporation.

When bonding the patterned patch to the lens, it is preferable to apply the bonding agent to the side of the patch having the patterned plastic. In this preferred embodiment, one applies the bonding agent around the overlap portion of the patch on the same side to which the patterned plastic was adhered, then presses the patterned patch against damaged area of the lens, and holds it in place, preferably for approximately 30 seconds, to insure bonding. When the patterned patch is bonded to the lens in this manner, the patterned plastic is then protected from weathering or from being removed from the patch itself.

Alternatively, the patterned plastic can be adhered to the thermoplastic patch after the patch is bonded to the lens. In this currently less preferred embodiment, the adhesive used to adhere its patterned plastic should preferably be moisture and UV resistant. The adhesive used may be the same as the adhesive or bonding agent discussed above.

The invention also provides a kit to restore the appearance of a damaged area of a patterned lens. The kit comprises a translucent thermoplastic patch, a patterned plastic sheet, and a bonding agent. The kit may be used in the method of this invention as described above. The components of the kit, including preferred embodiments, are the same as those described above.

Due to the close fitting nature of the patch and its use of water and UV resistant bonding agents, the restoration accomplished by the present invention can be relatively long-lasting, possibly obviating the need to replace the damaged lens. Thus, the restoration of damaged lens according to this invention can constitute a bona fide repair.

The claimed invention is:

1. A method for restoring the appearance of a damaged area of a patterned lens comprising the steps of:
    fitting a translucent thermoplastic patch to overlap the damaged area,
    adhering a patterned plastic sheet to the thermoplastic patch to form a patterned patch, and
    permanently bonding the patterned patch to the lens thereby covering the damaged area.

2. The method of claim 1, wherein the patterned plastic sheet is adhered to the thermoplastic patch before the patch is bonded to the lens.

3. The method of claim 2, wherein the side of the patterned patch bearing the patterned plastic sheet is bonded to the lens.

4. The method of claim 3, wherein the translucent thermoplastic patch is clear.

5. The method of claim 2, wherein the translucent thermoplastic patch is clear.

6. The method of claim 2, wherein the translucent thermoplastic patch is colored red, orange, amber, or yellow.

7. The method of claim 3, wherein the translucent thermoplastic patch is colored red, orange, amber, or yellow.

8. The method of claim 1, wherein the translucent thermoplastic patch is clear.

9. The method of claim 1, wherein the translucent thermoplastic patch is colored red, orange, amber, or yellow.

10. A method for restoring the appearance of a damaged area of a patterned lens, wherein the damaged area of the lens is curved or rounded, comprising the steps of:
    fitting a translucent thermoplastic patch to overlap the damaged area by,
    (i) determining the size and shape of the translucent thermoplastic patch,
    (ii) heating the translucent thermoplastic patch to cause it to become soft,
    (iii) forming the softened translucent thermoplastic patch to fit the damaged area of the lens,
    adhering a patterned plastic sheet to the thermoplastic patch to form a patterned patch, and
    permanently bonding the patterned patch to the lens.

11. The method of claim 10, wherein the patterned plastic sheet is adhered to the thermoplastic patch before the patch is bonded to the lens.

12. The method of claim 11, wherein the side of the patterned patch bearing the patterned plastic sheet is bonded to the lens.

13. A method for restoring the appearance of a damaged area of a patterned lens comprising the steps of:

fitting a translucent thermoplastic patch to overlap the damaged area, adhering a patterned plastic sheet to the thermoplastic patch to form a patterned patch, and permanently bonding the patterned patch to the lens, thereby covering the damaged area, wherein the patterned plastic sheet is made by printing a pattern onto one surface of a plastic sheet using offset, xerographic, or laser printing techniques.

14. The method of claim 13, wherein said pattern is printed onto said plastic sheet from a printing plate matching the lens pattern of the patterned lens to be restored.

15. The method of claim 13, wherein the patterned plastic sheet is adhered to the thermoplastic patch before the patch is bonded to the lens.

16. The method of claim 15, wherein the side of the patterned patch bearing the patterned plastic sheet is bonded to the lens.

17. A method for restoring the appearance of a damaged area of a patterned lens comprising the steps of:

fitting a translucent thermoplastic patch to overlap the damaged area, adhering a patterned plastic sheet to the thermoplastic patch to form a patterned patch, and permanently bonding the patterned patch to the lens thereby covering the damaged area, wherein said method steps do not require said lens to be disassembled.

18. A method for restoring the appearance of a damaged area of a patterned lens comprising the steps of:

fitting a translucent thermoplastic patch to overlap the damaged area, adhering a patterned plastic sheet to the thermoplastic patch to form a patterned patch, and permanently bonding the patterned patch to the exterior of the lens thereby covering the damaged area, wherein the side of the patterned patch bearing the patterned plastic sheet is bonded to the lens.

* * * * *